United States Patent
Mutya et al.

(10) Patent No.: US 8,725,145 B2
(45) Date of Patent: May 13, 2014

(54) MOBILE DEVICE REQUESTS OF NON-COMMUNICATION TIME PERIODS TO A WIRELESS COMMUNICATION NETWORK

(75) Inventors: Subbarayudu Mutya, Hyderabad (IN); Suresh Sanka, Hyderabad (IN)

(73) Assignee: Qualcomm Incorporated, San Diego, CA (US)

(*) Notice: Subject to any disclaimer, the term of this patent is extended or adjusted under 35 U.S.C. 154(b) by 201 days.

(21) Appl. No.: 13/089,976

(22) Filed: Apr. 19, 2011

(65) Prior Publication Data

US 2012/0190362 A1 Jul. 26, 2012

Related U.S. Application Data

(60) Provisional application No. 61/436,182, filed on Jan. 25, 2011.

(51) Int. Cl.
*H04W 8/18* (2009.01)

(52) U.S. Cl.
USPC .................................................... 455/435.1

(58) Field of Classification Search
CPC .......... H04W 76/048; H04W 36/0094; H04W 72/0406; H04W 68/00; H04W 88/06
USPC ........ 455/404.1, 435.1, 422.1, 436, 458, 574, 455/115, 517, 440, 456.1, 127, 519, 518, 455/41.2, 169, 563.1, 522; 370/516, 311, 370/318, 343, 338, 493, 574, 349
See application file for complete search history.

(56) References Cited

U.S. PATENT DOCUMENTS

| | | | |
|---|---|---|---|
| 5,533,099 A | 7/1996 | Byrne | |
| 8,179,833 B2 | 5/2012 | Attar et al. | |
| 2001/0023189 A1* | 9/2001 | Kajimura | 455/522 |
| 2003/0108005 A1 | 6/2003 | Agrawal et al. | |
| 2005/0003836 A1* | 1/2005 | Inoue et al. | 455/458 |
| 2005/0233704 A1* | 10/2005 | Maekawa | 455/69 |
| 2007/0097931 A1 | 5/2007 | Parekh et al. | |
| 2007/0121535 A1 | 5/2007 | Chen et al. | |
| 2008/0020769 A1 | 1/2008 | Parekh et al. | |
| 2008/0253352 A1 | 10/2008 | Thoukydides et al. | |
| 2009/0104905 A1* | 4/2009 | DiGirolamo et al. | 455/434 |
| 2009/0131054 A1 | 5/2009 | Zhang | |
| 2009/0141689 A1 | 6/2009 | Parekh et al. | |
| 2009/0186577 A1* | 7/2009 | Ross et al. | 455/41.2 |

(Continued)

FOREIGN PATENT DOCUMENTS

| CN | 1383636 A | 12/2002 |
|---|---|---|
| CN | 1459165 | 11/2003 |

(Continued)

OTHER PUBLICATIONS

International Search Report and Written Opinion—PCT/US2012/022268—ISA/EPO—Mar. 22, 2012.

(Continued)

*Primary Examiner* — Melody Mehrpour
(74) *Attorney, Agent, or Firm* — S. Hossain Beladi (57) ABSTRACT

A particular method includes sending a request from a mobile device associated with a plurality of subscriptions to a wireless communication network. The request indicates a time period requested by the mobile device as a non-communication time period of the wireless communication network with respect to the mobile device.

32 Claims, 6 Drawing Sheets

(56) References Cited

U.S. PATENT DOCUMENTS

| | | |
|---|---|---|
| 2009/0276303 A1* | 11/2009 | Singhal .................. 705/14.11 |
| 2009/0279511 A1 | 11/2009 | Zhu |
| 2009/0323598 A1 | 12/2009 | Stamoulis et al. |
| 2010/0267410 A1 | 10/2010 | Chin et al. |
| 2011/0064048 A1 | 3/2011 | Oguchi |
| 2013/0107867 A1 | 5/2013 | Li et al. |
| 2013/0231147 A1 | 9/2013 | Li et al. |

FOREIGN PATENT DOCUMENTS

| | | |
|---|---|---|
| CN | 101047954 A | 10/2007 |
| CN | 101051998 A | 10/2007 |
| CN | 101262674 A | 9/2008 |
| CN | 101610578 A | 12/2009 |
| EP | 2051551 A2 | 4/2009 |
| JP | 2007511183 A | 4/2007 |
| JP | 2010041162 A | 2/2010 |
| JP | 2011517920 A | 6/2011 |
| WO | 2009128842 | 10/2009 |
| WO | 2011116533 A1 | 9/2011 |

OTHER PUBLICATIONS

Qualcomm Europe: "Scheduling of measurements in LTE", 3GPP Draft; R2-060987, 3rd Generation Partnership Project (3GPP), Mobile Competence Centre ; 650, Route Des Lucioles ; F-06921 Sophia-Antipolis Cedex ; France, vol. RAN WG2, No. Athens, Greece; Mar. 23, 2006, XP050130916, [retrieved on Mar. 23, 2006].

Qualcomm Europe (Email Rapporteur): Email discussion summary: [62_LTE_CO2] Home eNB inbound mobility support: Remaining issues, 3GPP Draft; R2-083569, 3rd Generation Partnership Project. (3GPP), Mobile Competence Centre ; 650, Route Des Lucioles ; F-06921 Sophia-Antipolis Cedex ; France, vol. RAN WG2, No. Warsaw, Poland; Jun. 24, 2008, XP050140939, [retrieved on Jun. 24, 2008].

Qualcomm Europe: "Measurement gap scheduling", 3GPP Draft; R2-060058, 3rd Generation Partnership Project (3GPP), Mobile Competence Centre ; 650, Route Des Lucioles ; F-06921 Sophia-Antipolis Cedex ; France, vol. RAN WG2, No. Sophia Antipolis, France; Jan. 5, 2006, XP050130222, [retrieved on Jan. 5, 2006].

Qualcomm Europe: "Qualcomm proposal for E-UTRAN Architecture and Protocols" 3GPP Draft; R2-052921, SRD Generation Partnership Project (3GPP), Mobile Competence Centre ; 650, Route Des Lucioles ; F-06921 Sophia-Antipolis Cedex; France, vol. 1, No. Seoul,Korea;Nov. 7, 2005, Nov. 1, 2005, XP050130142.

Qualcomm Europe (Rapporteur): "[67#25] UMTS: Inbound mobility", 3GPP Draft; R2-095977-[67#25] UMTS Inbound Mobility, 3rd Generation Partnership Project (3GPP), Mobile Competence Centre ; 650, Route Des Lucioles ; F-06921 Sophia-Antipolis Cedex ; France, No. Miyazaki; Oct. 12, 2009, XP050390401, [retrieved on Oct. 9, 2009].

* cited by examiner

MOBILE DEVICE REQUESTS OF NON-COMMUNICATION TIME PERIODS TO A WIRELESS COMMUNICATION NETWORK

CLAIM OF PRIORITY

The present application claims priority from U.S. Provisional Patent Application No. 61/436,182 filed on Jan. 25, 2011, the contents of which are expressly incorporated herein by reference in their entirety.

BACKGROUND

1. Field

The present invention relates to mobile communication systems.

2. Background

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

Some wireless telephones may include multiple subscription capability. For example, each subscription may be associated with a different wireless telephone number. When a wireless telephone includes multi-subscription capability, the wireless telephone may occasionally tuneaway from a primary network to listen for data on one or more secondary networks. During tuneaway from a first network to a second network, the wireless telephone may go out-of-sync with the first network. Messages transmitted or retransmitted by the first network to the wireless telephone during the tuneaway period may not be received by the wireless telephone.

SUMMARY

Systems and methods of mobile device-controlled negotiation of a tuneaway schedule with a wireless communication network are disclosed. The systems and methods may be used in conjunction with wireless telephones and other mobile devices that support multiple subscriptions. For example, a wireless telephone may support two subscriber identity modules (SIMs) as part of a dual standby dual SIM (DSDS) configuration. The wireless telephone may register on two networks, including a different network corresponding to each SIM. Once registered, the wireless telephone may listen to pages of both networks while in an IDLE state. The wireless telephone may also listen to pages of one subscription while in packet transfer mode with respect to the other subscription.

As disclosed herein, a multi-subscription (e.g., DSDS) mobile device may transmit a request to a mobile communication network (e.g., to a base station of the mobile communication network). The request may indicate one or more time periods requested by the mobile communication device as non-communication time periods (e.g., gap cycles or slots) of the wireless communication network with respect to the mobile device. The wireless communication network may acknowledge and grant the request. The mobile device may utilize the granted non-communication time periods for tuneaways. The wireless communication network may discontinue communication of data to the mobile device during the non-communication time periods.

In a particular embodiment, a method includes sending a request from a mobile device associated with a plurality of subscriptions to a wireless communication network. The request indicates a time period indicated by the mobile device as a non-communication time period of the wireless communication network with respect to the mobile device.

In another particular embodiment, an apparatus includes a plurality of subscriber identity module (SIM) interfaces, each SIM interface configured to receive a SIM representing a subscription. The apparatus includes a processor and a memory storing instructions executable by the processor to send a request from the mobile device to a wireless communication network. The request indicates a time period indicated by the mobile device as a non-communication time period of the wireless communication network with respect to the mobile device.

In another particular embodiment, a method includes receiving a request at a wireless communication network from a mobile device associated with a plurality of subscriptions. The request indicates a time period requested by the mobile device as a non-communication time period of the wireless communication network with respect to the mobile device.

In another particular embodiment, an apparatus includes an interface configured to receive a request at a wireless communication network from a mobile device associated with a plurality of subscriptions. The request indicates a time period requested by the mobile device as a non-communication time period of the wireless communication network with respect to the mobile device. The interface is also configured to send an acknowledgement message to the mobile device in response to receiving the request. The apparatus further includes a processor and a memory storing instructions executable by the processor to discontinue communication from the wireless communication network to the mobile device during the non-communication time periods.

One particular advantage provided by at least one of the disclosed embodiments is that use of spectrum bandwidth at a wireless communication network may be improved. For example, the wireless communication network may discontinue communication to a mobile device during time periods requested by and granted to the mobile device as non-communication time periods.

Other aspects, advantages, and features of the present disclosure will become apparent after review of the entire application, including the following sections: Brief Description of the Drawings, Detailed Description, and the Claims.

DETAILED DESCRIPTION

Figure 1:
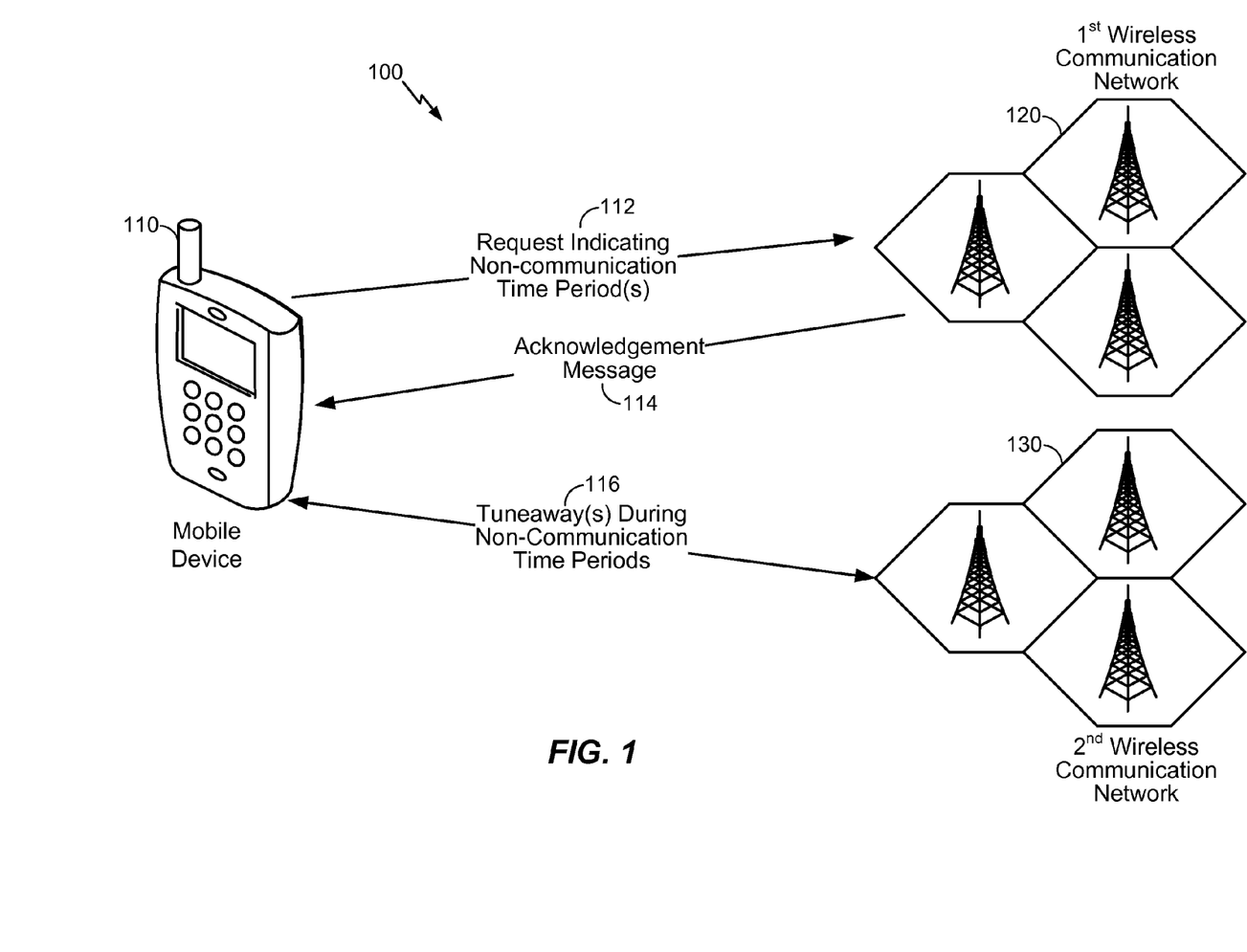
FIG. 1 is a diagram to illustrate a particular embodiment of a system to request non-communication time periods.

FIG. 1 is a diagram to illustrate a particular embodiment of a system 100 to request non-communication time periods. The system 100 includes a mobile device 110 configured to communicate with a first wireless communication network 120 and a second wireless communication network 130. In alternate embodiments, the mobile device 110 may be configured to communicate with any number of wireless communication networks.

In a particular embodiment, the mobile device 110 may support multiple subscriptions. For example, the mobile device 110 may be a wireless telephone that concurrently supports a first subscription to the first wireless communication network 120 and a second subscription to the second wireless communication network 130.

Each of the wireless communication networks 120, 130 may cover a geographic area that includes a plurality of cells. Each such cell covered by a particular network may include one or more base stations or towers responsible for transmitting data to and receiving data from mobile devices "camped" on that cell. Moreover, the wireless communication networks 120, 130 may operate in accordance with different radio access technologies. For example, the first wireless communication network 120 may be a long term evolution (LTE) network and the second wireless communication network 130 may be a global system for mobile communications (GSM) network. Alternate technologies, such as general packet radio service (GPRS), enhanced data rates for GSM evolution (EDGE), universal mobile telecommunications system (UMTS), generic radio access network (GRAN), evolution-data optimized (1x/DO), and wideband code division multiple access (WCDMA), and other radio access technologies may also be used.

In operation, the mobile device 110 may periodically tuneaway from one wireless communication network to listen for pages or other messages on a different wireless communication network. For example, the first wireless communication network 120 may be a "primary" network for the mobile device 110, and the mobile device 110 may periodically tuneaway from the first wireless communication network 120 to listen for pages on the second wireless communication network 130 (e.g., a "secondary" network). To illustrate, tuneaways may occur in accordance with a paging schedule of the second wireless communication network 130. During such tuneaways, the mobile device 110 may go out-of-sync with the first wireless communication network 120, and transmission/re-transmission of messages by the first wireless communication network 120 to the mobile device 110 may fail, resulting in wasted spectrum bandwidth. Tuneaways may also include changing an active radio frequency (RF) band of the mobile device 110, changing an active decoding or demodulation scheme at the mobile device 110, changing an active radio access technology at the mobile device 110, or any combination thereof.

To mitigate transmission/retransmission failure, the mobile device 110 may control characteristics of the tuneaway process and may inform the first wireless communication network 120 in advance of performing tuneaways. For example, the mobile device 110 may identify one or more time periods (e.g., "gap" cycles or slots) as candidate time periods in which to perform tuneaways. The time periods may be identified based on factors specific to the mobile device 110, to the first wireless communication network 120, to the second wireless communication network 130, or any combination thereof. For example, the time periods may be identified based on paging cycle information of the second wireless communication network 130 (e.g., how often and for how long the second wireless communication network 130 expects the mobile device 110 to be in-sync and receive pages).

As another example, the time periods may be identified based on a discontinuous transmission (DTX) schedule of the first wireless communication network 120 or a discontinuous reception (DRX) schedule of the mobile device 110. To illustrate, a circuit-switched CDMA base station may schedule communication discontinuities (e.g., periods of silence) during speech calls, and the mobile device 110 may determine that such periods of silence are candidates for tuneaway to another network. As a further example, the time periods may be identified based on a measurement period of the mobile device 110 (e.g., how long it takes the mobile device to perform a tuneaway or measure signal strength of the second wireless communication network 130). As another example, the time periods may be identified based on an application quality of service (QoS). To illustrate, if a particular application executing at the mobile device 110 expects a certain quality, frequency, or length of connection to the first wireless communication network 120 or to the second wireless communication network 130, the mobile device 110 may identify candidate tuneaway time periods that comply with such expectations.

The mobile device 110 may transmit a request 112 indicating the one or more identified time periods as requested non-communication time periods of the first wireless communication network 120 with respect to the mobile device 110. The request 112 may include a starting index (e.g., a radio frame or slot number) of the time period, a length (e.g., a number of radio frames or slots) of the time period, a periodicity of the time period, or any combination thereof.

In response to the request 112, the first wireless communication network 120 may transmit an acknowledgement message 114 to the mobile device 110. The acknowledgement message may indicate that the first wireless communication network 120 has granted the indicated time periods as non-communication time periods, and that the first wireless communication network 120 will prevent communication between the first wireless communication network 120 and the mobile device 110 during the granted non-communication time periods. The first wireless communication network 120 may prevent or discontinue communication with the mobile device 110 using various methods. For example, preventing communication with the mobile device 110 may include not transmitting data from a base station to the mobile device 110 during the non-communication time periods. Alternately, or in addition, the first wireless communication network 120 may use the non-communication time periods to create or modify a DTX/DRX schedule. It should be noted that the requested non-communication time periods may be independent of other pre-scheduled transmission gaps, such as compressed mode time periods during which the first wireless communication network 120 expects the mobile device 110 to perform signal measurement and report signal measurement results.

Upon receiving the acknowledgement message 114, the mobile device 110 may perform tuneaways 116 to the second wireless communication network 130 at the start of the non-communication time periods. The mobile device 110 may tune back to the first wireless communication network 120 at the end of the non-communication time periods. Should the mobile device 114 not receive the acknowledgement message (e.g., the mobile device 110 instead receives no reply or a denial message), the mobile device 110 may retransmit the request 112, transmit a different request (e.g., including different time period parameters), perform tuneaways in an arbitrary or previously scheduled fashion, or any combination thereof.

It should be noted that although the particular embodiment illustrated in FIG. 1 includes two subscriptions and two wireless networks, the systems and methods disclosed herein may be used in conjunction with any number of subscriptions and wireless networks. For example, an alternate two-network embodiment may include the mobile device requesting tuneaway periods from each of the wireless networks 120, 130. In yet another embodiment, the mobile device 110 may request tuneaway periods in recursive fashion. For example, the mobile device 110 may request the first wireless communication network 120 for an extended gap period during which the mobile device 110 may tuneaway to the second wireless communication network 130 and further tuneaway from the second wireless communication network 130 to a third wireless communication network (not shown) during a nested tuneaway period requested from the second wireless communication network 130.

It will be appreciated that since the first wireless communication network 120 is aware of the tuneaways 116, the first wireless communication network 120 may avoid attempts to communicate with the mobile device 110 during the tuneaways 116, thereby mitigating message transmission/retransmission failure and achieving an improved utilization of spectrum bandwidth. It will also be appreciated that the system 100 of FIG. 1 may enable individual mobile devices to control non-communication time periods. Since different mobile devices may have different tuneaway requirements, device-specified non-communication time periods may be better suited to tuneaways than network-controlled gaps such as DTX/DRX gaps or compressed mode gaps.

Figure 2:
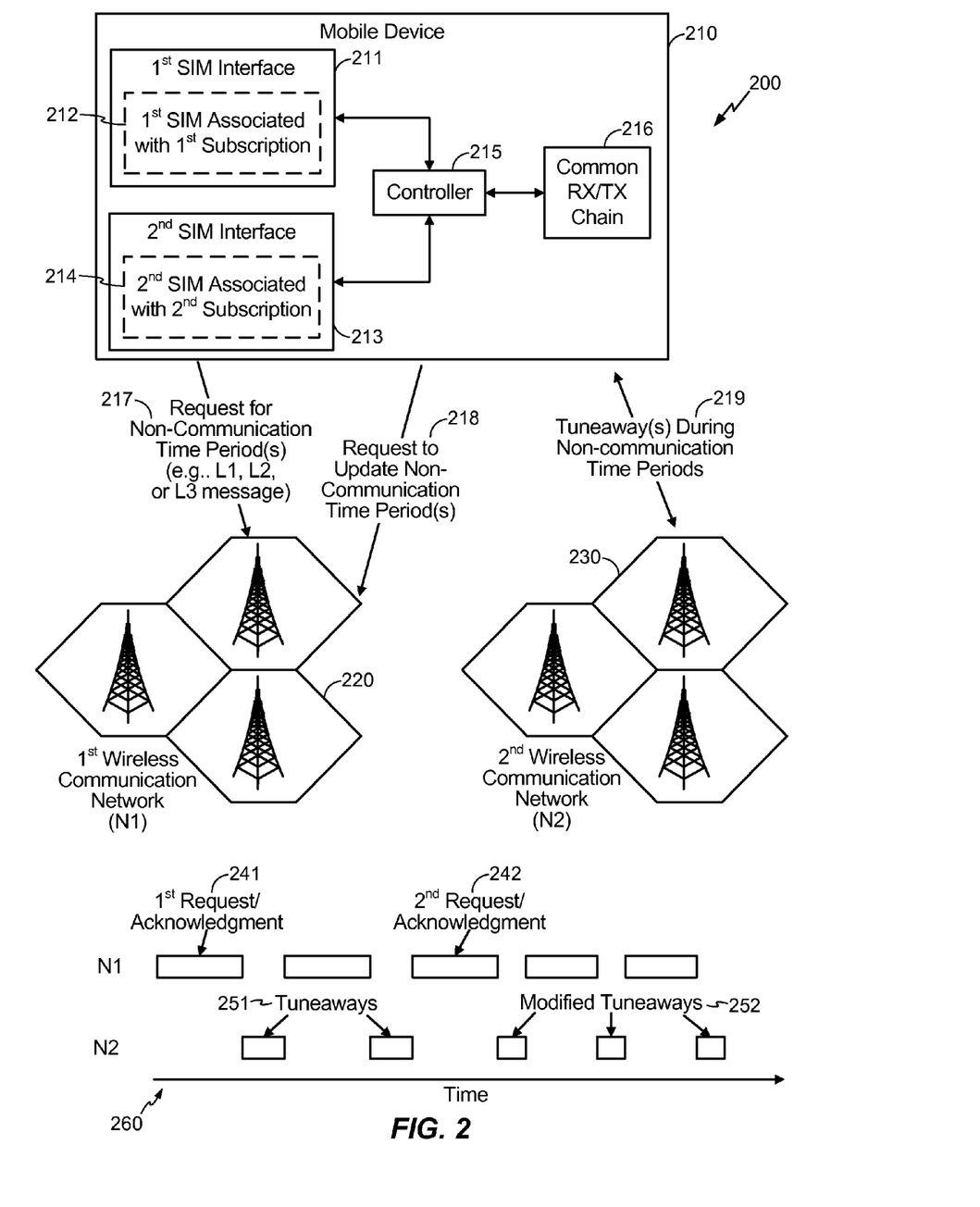
FIG. 2 is a diagram to illustrate another particular embodiment of a system to request non-communication time periods.

FIG. 2 is a diagram to illustrate another particular embodiment of a system 200 to request non-communication time periods. The system 200 includes a mobile device 210 configured to communicate with a first wireless communication network 220 and a second wireless communication network 230. In an illustrative embodiment, the mobile device 210 may be the mobile device 110 of FIG. 1, the first wireless communication network 220 may be the first wireless communication network 120 of FIG. 1, and the second wireless communication network 230 may be the second wireless communication network 130 of FIG. 1.

In a particular embodiment, the mobile device 210 may be a dual standby dual SIM (DSDS) device. For example, the mobile device 210 may include a first SIM interface 211 configured to receive (e.g., via electrical contact) a first SIM 212 associated with a first subscription to the first wireless communication network 220. The mobile device 220 may also include a second SIM interface 213 configured to receive a second SIM 214 associated with a second subscription to the second wireless communication network 230. Each of the subscriptions may be an LTE subscription, a GSM subscription, a GPRS subscription, an EDGE subscription, a UMTS subscription, a GRAN subscription, a 1x/DO subscription, a WCDMA subscription, some other subscription, or any combination thereof.

The mobile device 210 may further include a common receive/transmit (RX/TX) chain 216 shared between the first SIM 212 and the second SIM 214, and a controller 215 configured to arbitrate access to the common RX/TX chain 216. Since the mobile device 210 may support multiple subscriptions using a single RX/TX chain, the mobile device 210 may perform tuneaways. It should be noted that although device manufacturers may remove the need for tuneaways by including additional RX/TX chains, the addition of RX/TX chains may result in more expensive and less battery-efficient mobile devices.

During operation, the mobile device 210 may transmit a request 217 for one or more non-communication time periods to the first wireless communication network 220. In an illustrative embodiment, the request 217 may be the request 112 of FIG. 1. The mobile device 210 may receive an acknowledgement (not shown) from the first wireless communication network 220 in response to the request 217. Upon receiving the acknowledgement, the mobile device 210 may perform tuneaways 219 to the second wireless communication network 230 during the non-communication time periods.

In a particular embodiment, the mobile device may transmit the request 217 to the first wireless communication network via a layer-1 (L1), layer-2 (L2), or layer-3 (L3) communication session. For example, the request 217 may be transmitted via semi-static L3 signaling, such as radio resource control (RRC) in WCDMA systems. The L3 session may have a duration greater than or equal to one hundred milliseconds. Alternately, the request 217 may be transmitted via dynamic L1 or L2 signaling, which may have a duration of approximately ten milliseconds and which may rely on enhanced uplink (EUL) scheduling information, a channel quality indication (CQI) reporting pattern, or uplink physical layer L1 signaling. Semi-static updates may propose predetermined gap periods to the network at a reduced signaling overhead, whereas dynamic signaling may enable the taking of conditions at a mobile device (e.g., uplink (UL) buffer status) into account at the cost of a higher signaling overhead.

To illustrate, in a WCDMA implementation, the mobile device 110 may transmit a "UE GAP UPDATE REQUEST" message via RRC signaling, where the message indicates requested non-communication time periods to the first wireless communication network 220. The message may be communicated in either an IDLE or a CONNECTED mode state. For example, with respect to UMTS, the message may be applicable in a forward access channel (Cell_FACH) state, a dedicated channel (Cell_DCH) state, and an IDLE state. The first wireless communication network 220 may transmit a "UE GAP UPDATE CONFIRM" message to the mobile device 210 as an acknowledgement. When the mobile device 210 subsequently camps on a different cell of the first wireless communication network 220, the mobile device 210 may transmit another "UE GAP UPDATE REQUEST" message.

In a particular embodiment, the mobile device 210 may be operable to update previously granted non-communication time periods by transmitting a second request 218 to the first wireless communication network 220. For example, the mobile device 210 may increase or decrease a length or frequency of the non-communication time periods. To illustrate, the frequency of the non-communication time periods may be altered in response to a change in the paging cycle of the second wireless communication network 230. As another example, the length of the non-communication time periods may be reduced in response to the mobile device 210 determining that the tuneaways 219 can be successfully performed faster than originally anticipated. Upon receiving the second request 220, the first wireless communication network 220 may transmit a second acknowledgement (not shown).

FIG. 2 also depicts a timeline 260 corresponding to the described operation at the system 200, where "N1" represents the first wireless communication network 220 and "N2" represents to the second wireless communication network 230. A first request/acknowledgement 241 may occur at N1, followed by periodic tuneaways 251 at N2. A second request/acknowledgement 242 may then occur at N1 to increase or decrease a length of the tuneaways 251, followed by the occurrence of modified tuneaways 252 at N2.

Figure 3:
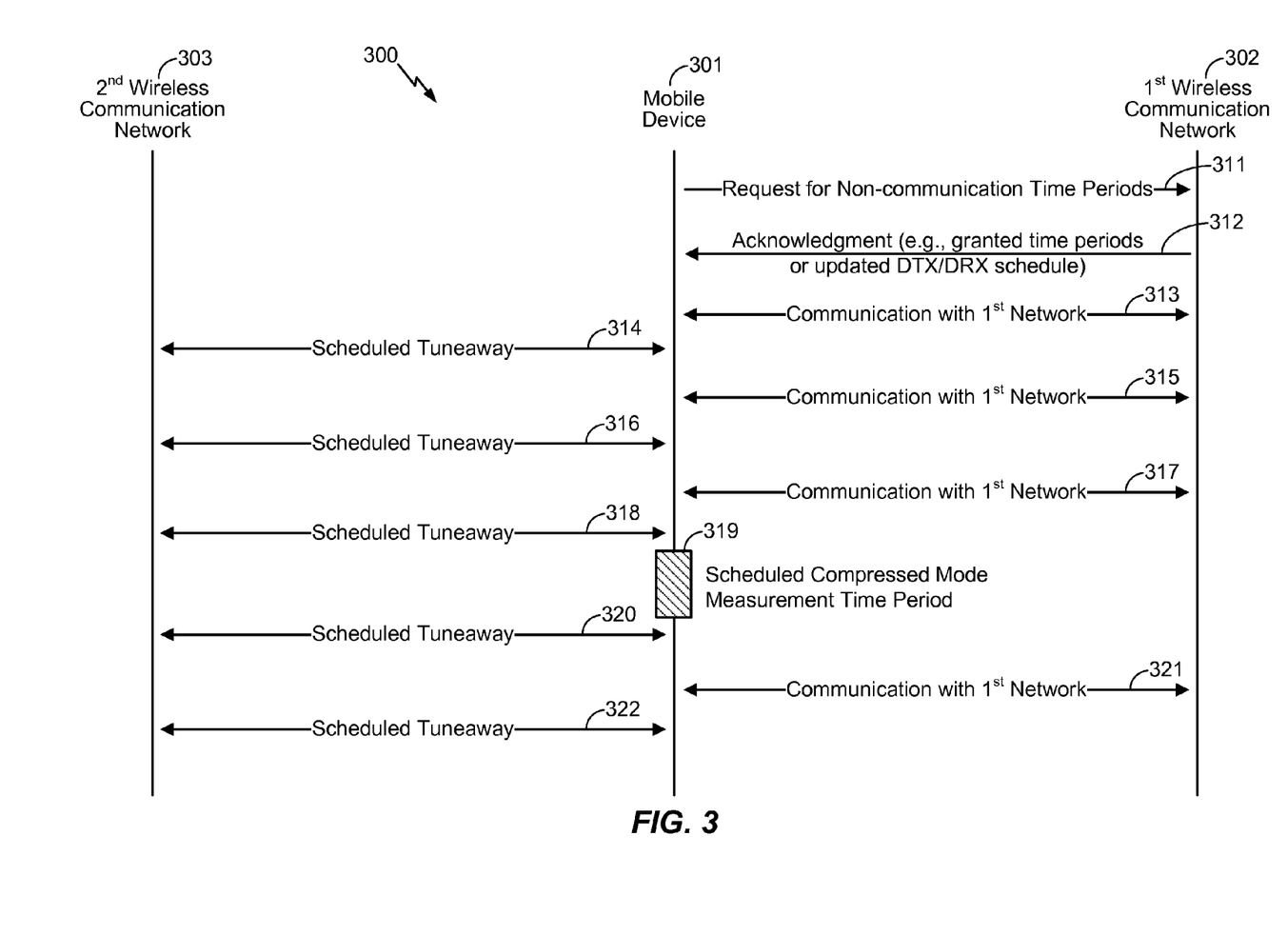
FIG. 3 is a ladder diagram to illustrate a particular embodiment of operation at the system of FIG. 1 or at the system of FIG. 2.

FIG. 3 is a ladder diagram 300 to illustrate a particular embodiment of operation at the system 100 of FIG. 1 or at the system 200 of FIG. 2. The diagram 300 depicts communication between a mobile device 301, a first wireless communication network 302, and a second wireless communication network 303. In an illustrative embodiment, the mobile device 301 may be the mobile device 110 of FIG. 1 or the mobile device 210 of FIG. 2, the first wireless communication network 302 may be the first wireless communication network 120 of FIG. 1 or the first wireless communication network 220 of FIG. 2, and the second wireless communication network 303 may be the second wireless communication network 130 of FIG. 1 or the second wireless communication network 230 of FIG. 2.

As depicted in FIG. 3, the mobile device 301 may initially transmit a request 311 for non-communication time periods to the first wireless communication network 302 and may receive an acknowledgement 312 from the first wireless communication network 302. The request 311 and the acknowledgement 312 may represent an agreed upon tuneaway schedule corresponding to granted non-communication time periods, an updated DTX/DRX schedule, or any combination thereof.

The mobile device 301 may then conduct communication 313, 315, 317, 321 with the first wireless communication network 302 along with intermittent tuneaways 314, 316, 318, 320, 322 to the second wireless communication network 303 in accordance with the agreed upon schedule. The mobile device 301 may also perform signal measurement during one or more scheduled compressed mode measurement time periods, such as an illustrative compressed mode measurement time period 319.

Figure 4:
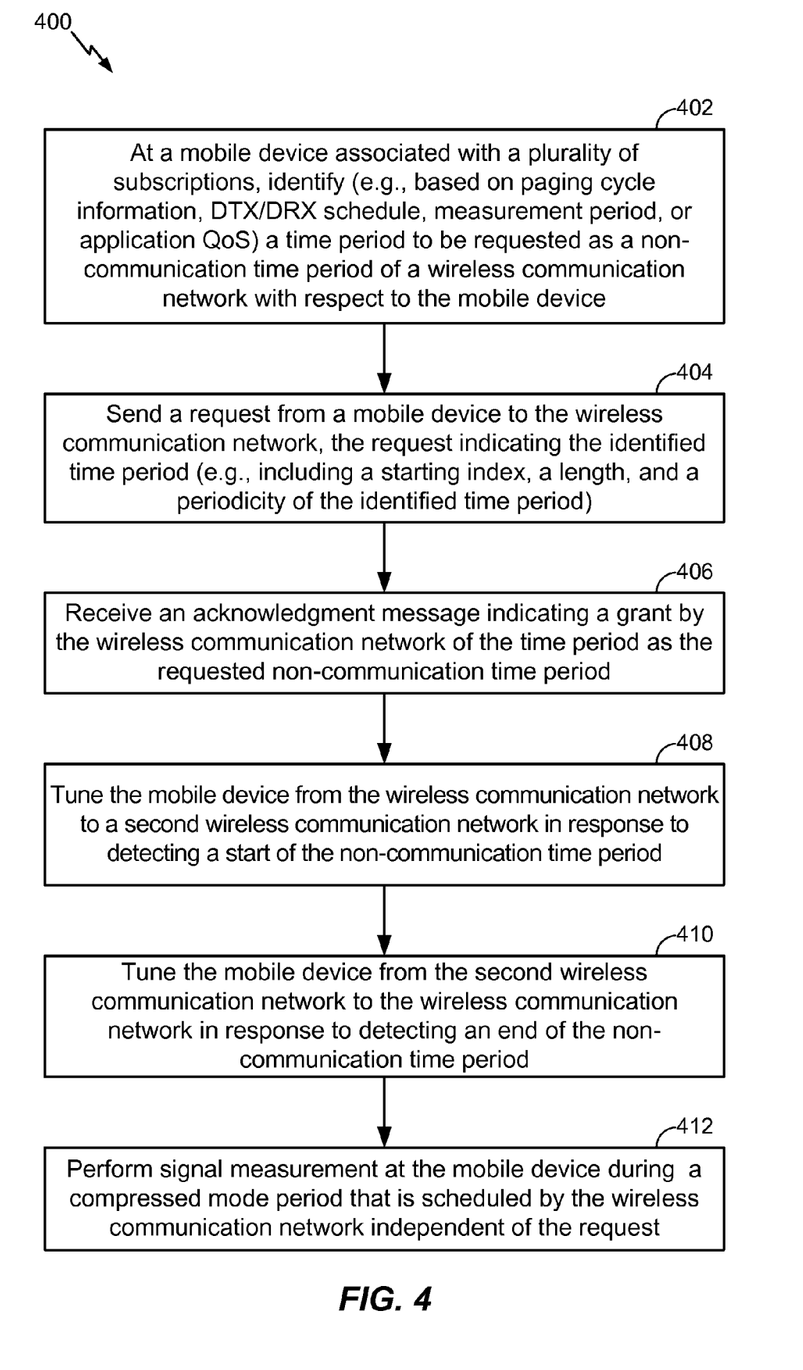
FIG. 4 is a flow diagram to illustrate a particular embodiment of a method of requesting non-communication time periods.

FIG. 4 is a flow diagram to illustrate a particular embodiment of a method 400 of requesting a non-communication time period. In an illustrative embodiment, the method 400 may be performed by the mobile device 110 of FIG. 1, the mobile device 210 of FIG. 2, or the mobile device 301 of FIG. 3.

The method 400 may include, at a mobile device associated with a plurality of subscriptions, identifying a time period to be requested as a non-communication time period of a wireless communication network with respect to the mobile device, at 402. The time period may be identified based on paging cycle information, a DTX/DRX schedule, a measurement period, or an application QoS. For example, in FIG. 1, the mobile device 110 may identify a time period to be requested as a non-communication time period.

The method 400 may also include sending a request from the mobile device to the wireless communication network, at 404. The request may indicate the identified time period (e.g., by including a starting index, a length, and a periodicity of the identified time period). For example, in FIG. 1, the mobile device 110 may send the request 112 to the first wireless communication network 120.

The method 400 may further include receiving an acknowledgement message, at 406. The acknowledgement message may indicate a grant by the wireless communication network of the time period as the requested non-communication time period. For example, in FIG. 1, the mobile device 110 may receive the acknowledgement message 114.

The method 400 may include tuning the mobile device from the wireless communication network to a second wireless communication network in response to detecting a start of the non-communication time period, at 408. The method 400 may also include tuning the mobile device from the second wireless communication network back to the wireless communication network in response to detecting an end of the non-communication time period, at 410. For example, in FIG. 1, the mobile device 110 may perform the tuneaways 116.

The method 400 may also include performing signal measurement at the mobile device during a compressed mode period, at 412. The compressed mode period may be scheduled by the wireless communication network independent of the request. For example, in FIG. 1, the mobile device 110 may perform signal measurement during a compressed mode period. To illustrate, the compressed mode period may be scheduled as described with reference to the compressed mode measurement time period 319 of FIG. 3.

Figure 5:
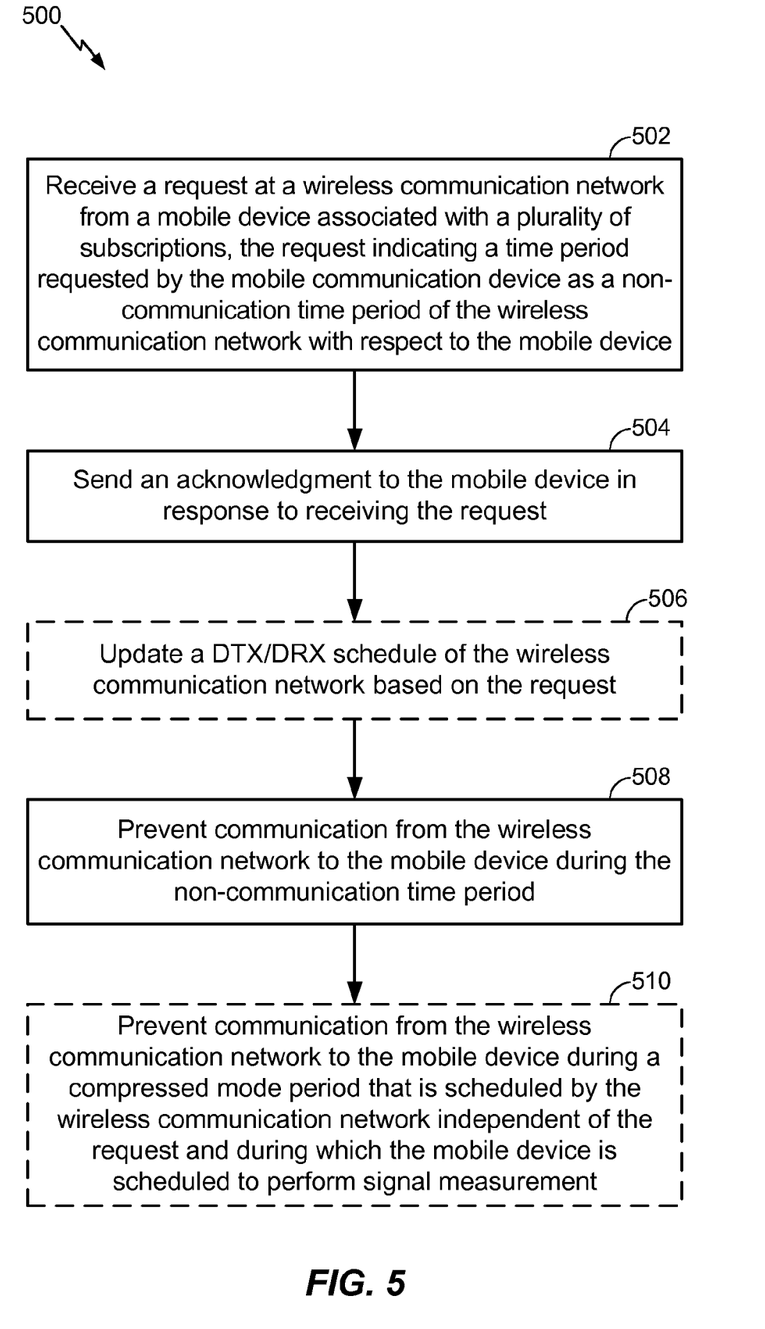
FIG. 5 is a flow diagram to illustrate a particular embodiment of a method of preventing communication to a mobile device from a wireless communication network during a requested non-communication time period.

FIG. 5 is a flow diagram to illustrate a particular embodiment of a method 500 of preventing or discontinuing communication to a mobile device from a wireless communication network during a requested non-communication time period. In an illustrative embodiment, the method 500 may be performed by a base station or other network device of a wireless communication network, such as the first wireless communication network 120 of FIG. 1, the first wireless communication network 220 of FIG. 2, or the first wireless communication network 302 of FIG. 3.

The method 500 may include receiving a request at a wireless communication network from a mobile device (e.g., a mobile phone associated with a plurality of subscriptions), at 502. The request may indicate a time period requested by the mobile communication device as a non-communication time period of the wireless communication network with respect to the mobile device. For example, in FIG. 1, the first wireless communication network 120 may receive the request 112 from the mobile device 110.

The method 500 may also include sending an acknowledgment to the mobile device in response to receiving the request, at 504. For example, in FIG. 1, the first wireless communication network 120 may transmit the acknowledgement message 114 to the mobile device 110.

The method 500 may optionally include updating a DTX/DRX schedule of the wireless communication network based on the request, at 506. For example, in FIG. 1, the first wireless communication network 120 may update a DTX/DRX schedule applicable to communications between the first wireless communication network 120 and the mobile device 110.

The method 500 may further include preventing communication from the wireless communication network to the mobile device during the non-communication time period, at 508. When the method 500 includes updating the DTX/DRX schedule (at 506), the non-communication time period may coincide with a DTX/DRX period. For example, in FIG. 1, the first wireless communication network 120 may prevent communication between the first wireless communication network 120 and the mobile device 110 during the tuneaways 116 to the second wireless communication network 130.

The method 500 may optionally include preventing communication from the wireless communication network to the mobile device during a compressed mode period, at 510. The compressed mode period may be scheduled by the wireless communication network independent of the request, and the mobile device may be scheduled to perform signal measurement during the compressed mode period. For example, in FIG. 1, the first wireless communication network 120 may also refrain from sending messages to the mobile device 110 during compressed mode time periods that were previously scheduled by the first wireless communication network 120 independent of the request 112.

Figure 6:
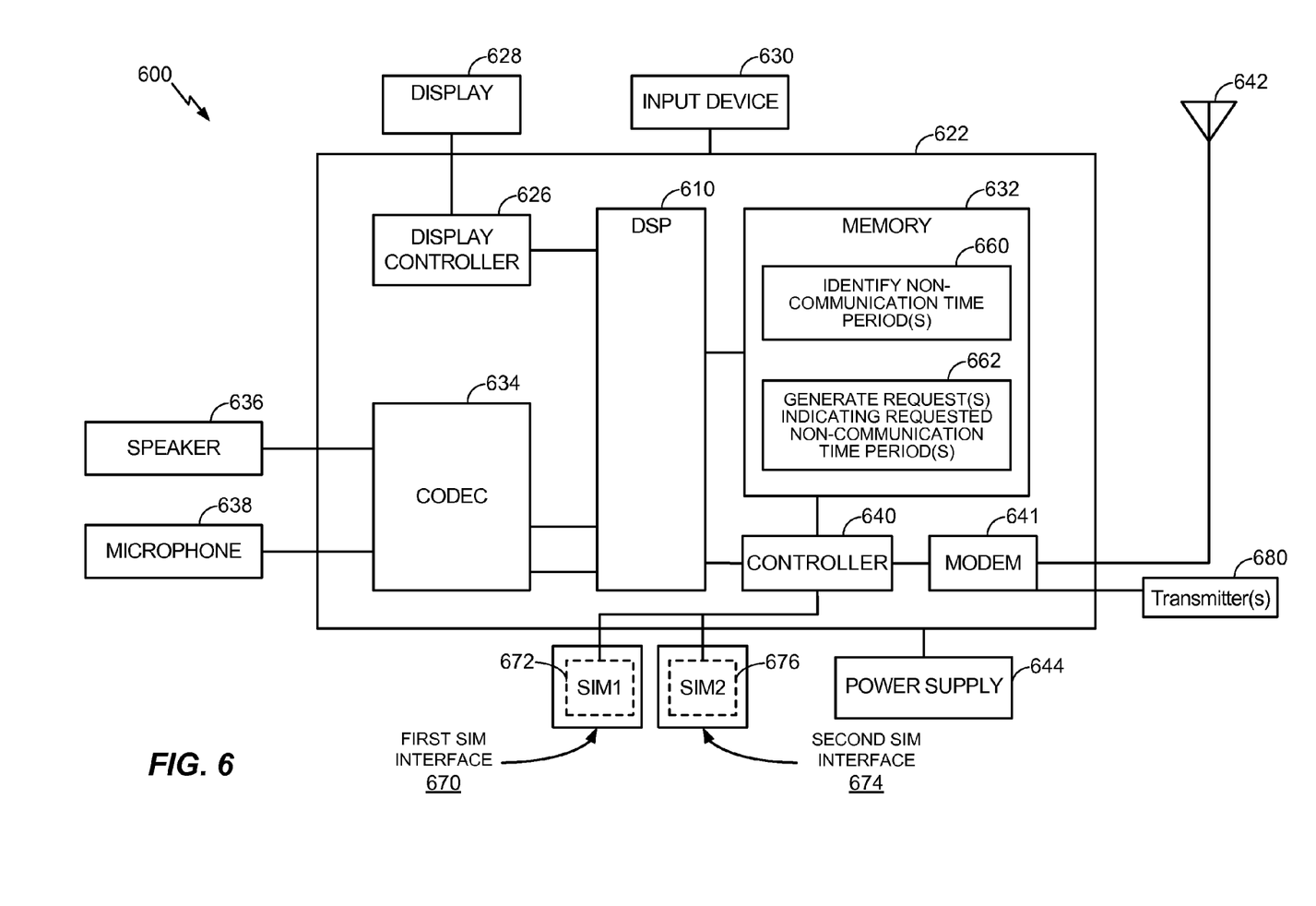
FIG. 6 is a block diagram of a mobile communication device that supports multiple subscriptions.

FIG. 6 is a block diagram of a mobile communication device 600 that supports multiple subscriptions. In one embodiment, the mobile communication device 600 or components thereof include or are included within the mobile device 110 of FIG. 1, the mobile device 210 of FIG. 2, or the mobile device 301 of FIG. 3. Further, all or part of the method described in FIG. 4 may be performed at or by the mobile communication device 600. The mobile communication device 600 includes a processor, such as a digital signal processor (DSP) 610, coupled to a memory 632.

In the embodiment illustrated in FIG. 6, the mobile communication device 600 includes a first SIM interface 670 and a second SIM interface 674. The first SIM interface 670 may be configured to receive a first SIM 672 that is associated with a first subscription, and the second SIM interface 674 may be configured to receive a second SIM 676 that is associated with a second subscription. For example, at least one of the SIM interfaces 670, 674 may be a SIM card connector that includes a body having an accommodating space for a SIM card and multiple connected-through receptacles for receiving conducting terminals of a received SIM card. An electrical signaling contact with the SIM card may be made through the conducting terminals and the receptacles. An example interface may include a serial or parallel (e.g., 6-pin or 8-pin) connection. Further, multiple SIM card sizes may be accommodated (e.g., full-size, mini-SIM, or micro-SIM).

FIG. 6 also shows a display controller 626 that is coupled to the digital signal processor 610 and to a display 628. A coder/decoder (CODEC) 634 can also be coupled to the digital signal processor 610. A speaker 636 and a microphone 638 can be coupled to the CODEC 634. FIG. 6 also indicates that a controller 640 (e.g., the controller 215 of FIG. 2) can be coupled to the digital signal processor 610 and to a modem 641 in communication with at least one wireless antenna 642 and at least one transmitter 680. The controller 640 may arbitrate or otherwise control access to a single RX/TX chain (e.g., access to one or more of the DSP 610, the model 641, the antenna 642, and the transmitter 680). The arbitration may be based on a tuneaway schedule agreed upon by the mobile communication device 600 and a wireless communication network. The controller 640 may also switch tuning of the mobile communication device 600 from one wireless communication network to another wireless communication network.

The memory 632 may be a non-transitory tangible computer-readable storage medium that stores instructions. The instructions may be executable by the DSP 610 to perform one or more functions or methods described herein. For example, the memory 632 may include instructions 660 executable by the DSP 610 to identify one or more non-communication time periods. The memory 632 may also include instructions 662 executable by the DSP 610 to generate one or more requests (e.g., to be sent by the transmitter 680) indicating one or more requested non-communication time periods.

In a particular embodiment, the DSP 610, the display controller 626, the memory 632, the CODEC 634, the controller 640, and the modem 641 are included in a system-in-package or system-on-chip device 622. In a particular embodiment, the input device 630 and a power supply 644 are coupled to the system-on-chip device 622. Moreover, in a particular embodiment, as illustrated in FIG. 6, the display device 628, the input device 630, the speaker 636, the microphone 638, the wireless antenna 642, the transmitter 680, the power supply 644, the first SIM 672, the first SIM interface 670, the second SIM 676, and the second SIM interface 674 are external to the system-on-chip device 622. However, each of the display device 628, the input device 630, the speaker 636, the microphone 638, the wireless antenna 642, the transmitter 680, the power supply 644, the first SIM 672, the first SIM interface 670, the second SIM 676, and the second SIM interface 674 can be coupled to a component of the system-on-chip device 622, such as an interface or a controller.

In a particular embodiment, one or more components or corresponding components of the mobile communication device 600 of FIG. 6 may be included in a network-side base station or tower. For example, a base station of wireless communication network may include one or more antennas (e.g., operable to receive requests for non-communication time periods from mobile devices), one or more transmitters (e.g., operable to transmit acknowledgement messages to the mobile devices), a modem, a processor, and a memory storing instructions executable by the processor to prevent or discontinue communication from the base station to a particular mobile device during a non-communication time period granted to the particular mobile device.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
sending a request from a mobile device associated with a plurality of subscriptions to a wireless communication network, the request indicating a time period requested by the mobile device as a non-communication time period wherein the wireless communication network is requested to refrain from wirelessly communicating with the mobile device;
wherein the mobile device is configured to wirelessly communicate with a second wireless communication network during the non-communication time period and return to wirelessly communicating with the wireless communication network after the non-communication time period.

2. The method of claim 1, wherein the request includes a starting index of the time period, a length of the time period, a periodicity of the time period, or any combination thereof.

3. The method of claim 1, further comprising identifying the time period at the mobile device.

4. The method of claim 3, wherein the time period is identified at the mobile device based on paging cycle information of another wireless communication network, a discontinuous transmission (DTX) schedule of the wireless communication network, a discontinuous reception (DRX) schedule of the mobile device, a measurement period of the mobile device, an application quality of service (QoS), or any combination thereof.

5. The method of claim 1, further comprising receiving an acknowledgement message indicating a grant by the wireless communication network of the time period as the requested non-communication time period.

6. The method of claim 5, further comprising sending a second request to the wireless communication network to update at least one of a start of the non-communication time period, an end of the non-communication time period, and a length of the non-communication time period.

7. The method of claim 5, further comprising tuning the mobile device from the wireless communication network to the second wireless communication network in response to a start of the non-communication time period.

8. The method of claim 7, further comprising tuning the mobile device from the second wireless communication network to the wireless communication network in response to an end of the non-communication time period.

9. The method of claim 1, wherein the request is transmitted via a dynamic layer-1 or layer-2 communication session.

10. The method of claim 9, wherein the dynamic layer-1 or layer-2 communication session has a duration of approximately ten milliseconds.

11. The method of claim 1, wherein the request is transmitted via a layer-3 communication session.

12. The method of claim 11, wherein the layer-3 communication session has a duration greater than or equal to one hundred milliseconds.

13. The method of claim 1, wherein the mobile device comprises a first subscriber identity module (SIM) associated with a first subscription, a second subscriber identity module associated with a second subscription, and a receive/transmit (RX/TX) chain shared by the first SIM and the second SIM.

14. The method of claim 13, wherein at least one of the first subscription and the second subscription is a global systems for mobile communications (GSM) subscription, a general packet radio service (GPRS) subscription, an enhanced data rates for GSM evolution (EDGE) subscription, a universal mobile telecommunications system (UMTS) subscription, a generic radio access network (GRAN) subscription, an evolution-data optimized (1x/DO) subscription, a long term evolution (LTE) subscription, a wideband code division multiple access (WCDMA) subscription, or any combination thereof.

15. A mobile device comprising:
a plurality of subscriber identity module (SIM) interfaces, each SIM interface configured to receive a SIM;
a processor; and
a memory storing instructions executable by the processor to send a request from the mobile device to a wireless communication network, the request indicating a time period requested by the mobile device as a non-communication time period wherein the wireless communication network is requested to refrain from wirelessly communicating with the mobile device;
wherein the mobile device is configured to wirelessly communicate with a second wireless communication network during the non-communication time period and return to wirelessly communicating with the wireless communication network after the non-communication time period.

16. The mobile device of claim 15, further comprising:
a first SIM coupled to a first SIM interface, the first SIM representing a first subscription;
a second SIM coupled to a second SIM interface, the second SIM representing a second subscription; and
a receive/transmit (RX/TX) chain shared by the first SIM and the second SIM and configured to communicate via the wireless communication network.

17. A non-transitory computer-readable medium comprising instructions that, when executed by a processor, cause the processor to:
send a request from a mobile device associated with a plurality of subscriptions to a wireless communication network, the request indicating a time period requested by the mobile device as a non-communication time period wherein the wireless communication network is requested to refrain from wirelessly communicating with the mobile device;
wherein the mobile device is configured to wirelessly communicate with a second wireless communication network during the non-communication time period and return to wirelessly communicating with the wireless communication network after the non-communication time period.

18. The non-transitory computer-readable medium of claim 17, further comprising instructions that, when executed by the processor, cause the processor to identify the time period at the mobile device.

19. An apparatus comprising:
means for identifying at least one time period requested as a non-communication time period of a wireless communication network with respect to a mobile device associated with a plurality of subscriptions; and
means for sending a request to the wireless communication network indicating the at least one identified time period, wherein the wireless communication network is requested to refrain from wirelessly communicating with the mobile device during the non-communication time period;

wherein the mobile device is configured to wirelessly communicate with a second wireless communication network during the non-communication time period and return to wirelessly communicating with the wireless communication network after the non-communication time period.

20. The apparatus of claim 19, further comprising tune-away means for switching tuning of the mobile device from the wireless communication network to at least a second wireless communication network.

21. A method comprising:
receiving a request at a wireless communication network from a mobile device associated with a plurality of subscriptions, the request indicating a time period requested by the mobile device as a non-communication time period of the wireless communication network with respect to the mobile device;
wherein the wireless communication network is configured to, in response to the request, refrain from communicating with the mobile device during the non-communication time period and resume wirelessly communicating with the mobile device after completion of the non-communication time period.

22. The method of claim 21, further comprising:
sending an acknowledgement message to the mobile device in response to receiving the request.

23. The method of claim 22, wherein preventing communication from the wireless communication network to the mobile device during the non-communication time period comprises not transmitting data to the mobile device during the non-communication time period.

24. The method of claim 22, further comprising preventing communication between the wireless communication network and the mobile device during a compressed mode period that is scheduled by the wireless communication network independent of the request.

25. The method of claim 24, wherein the mobile device is scheduled to perform signal measurement during the compressed mode period.

26. The method of claim 21, further comprising updating a discontinuous transmission/discontinuous reception (DTX/DRX) schedule of the wireless communication network based on the request.

27. An apparatus comprising:
an interface configured to:
receive a request at a wireless communication network from a mobile device associated with a plurality of subscriptions, the request indicating a time period requested by the mobile device as a non-communication time period of the wireless communication network with respect to the mobile device; and
send an acknowledgement message to the mobile device in response to receiving the request;
a processor; and
a memory storing instructions executable by the processor to prevent transmission of wireless communications from the wireless communication network to the mobile device during the non-communication time period and to resume transmission of wireless communications to the mobile device after completion of the non-communication time period.

28. The apparatus of claim 27, wherein the instructions are further executable by the processor to prevent communication between the wireless communication network and the mobile device during a compressed mode period that is scheduled by the wireless communication network independent of the request.

29. A non-transitory computer-readable medium comprising instructions that, when executed by a processor, cause the processor to:
receive a request at a wireless communication network from a mobile device associated with a plurality of subscriptions, the request indicating a time period requested by the mobile device as a non-communication time period of the wireless communication network with respect to the mobile device;
wherein the wireless communication network is configured to, in response to the request, refrain from communicating with the mobile device during the non-communication time period and resume wirelessly communicating with the mobile device after completion of the non-communication time period.

30. The non-transitory computer-readable medium of claim 29, further comprising instructions that, when executed by the processor, cause the processor to:
transmit an acknowledgement message to the mobile device in response to receiving the request.

31. An apparatus, comprising:
means for receiving a request at a wireless communication network from a mobile device associated with a plurality of subscriptions, the request indicating a time period requested by the mobile device as a non-communication time period of the wireless communication network with respect to the mobile device; and
means for preventing transmission of wireless communications from the wireless communication network to the mobile device during the non-communication time period and resuming transmission of wireless communications to the mobile device after completion of the non-communication time period.

32. The apparatus of claim 31, further comprising means for sending an acknowledgement message to the mobile device in response to receiving the request.

* * * * *